United States Patent
Alexander et al.

(10) Patent No.: US 11,697,723 B2
(45) Date of Patent: Jul. 11, 2023

(54) STRETCHABLE MULTILAYER ARTICLE

(71) Applicant: KURARAY CO., LTD., Kurashiki (JP)

(72) Inventors: Reid Alexander, Houston, TX (US); Wataru Hirose, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 215 days.

(21) Appl. No.: 17/062,741

(22) Filed: Oct. 5, 2020

(65) Prior Publication Data

US 2021/0102043 A1  Apr. 8, 2021

Related U.S. Application Data

(60) Provisional application No. 62/910,626, filed on Oct. 4, 2019.

(51) Int. Cl.
| | |
|---|---|
| C08K 5/053 | (2006.01) |
| A41D 19/00 | (2006.01) |
| A41D 19/015 | (2006.01) |
| B32B 27/08 | (2006.01) |
| B32B 27/30 | (2006.01) |
| B32B 27/40 | (2006.01) |
| C08K 5/098 | (2006.01) |
| B32B 27/28 | (2006.01) |
| B32B 27/32 | (2006.01) |
| B32B 27/34 | (2006.01) |
| B32B 27/36 | (2006.01) |

(52) U.S. Cl.
CPC .......... *C08K 5/053* (2013.01); *A41D 19/0006* (2013.01); *A41D 19/015* (2013.01); *B32B 27/08* (2013.01); *B32B 27/306* (2013.01); *B32B 27/40* (2013.01); *C08K 5/098* (2013.01); *B32B 2250/03* (2013.01); *B32B 2250/24* (2013.01); *B32B 2250/40* (2013.01); *B32B 2307/714* (2013.01); *B32B 2307/7265* (2013.01); *B32B 2437/02* (2013.01)

(58) Field of Classification Search
CPC combination set(s) only.
See application file for complete search history.

(56) References Cited

U.S. PATENT DOCUMENTS

| | | |
|---|---|---|
| 10,053,551 B2 | 8/2018 | Chow et al. |
| 2012/0237747 A1* | 9/2012 | Tai .......................... B32B 27/18 428/212 |
| 2017/0044350 A1* | 2/2017 | Chow .................... B32B 27/306 |
| 2017/0326852 A1 | 11/2017 | Chow et al. |

* cited by examiner

Primary Examiner — Ramsey Zacharia
(74) Attorney, Agent, or Firm — Oblon, McClelland, Maier & Neustadt, L.L.P.

(57) ABSTRACT

A multilayer article comprising at least a first layer of a thermoplastic polyurethane (TPU) resin composition, a second layer of a TPU resin composition and a core layer between the first layer and the second layer, the core layer comprising a barrier resin composition, wherein the barrier resin composition comprises an ethylene vinyl alcohol copolymer (EVOH) (A), a hydroxyl group containing compound (B) having a molecular weight of 200 or less, a ratio of a number of hydroxyl groups in one molecule relative to the molecular weight within a range of form 0.02 to 0.03, and a melting point of from about 23° C. to about 200° C., and a fatty acid metal salt (C), the multilayer article having good elasticity, stretchability and barrier properties suitable for use in chemical suits and gloves.

13 Claims, No Drawings

STRETCHABLE MULTILAYER ARTICLE

CROSS REFERENCE TO RELATED APPLICATIONS

This application claims priority under 35 U.S.C. § 119 from U.S. Provisional Application Ser. No. 62/910,626 (filed 4 Oct. 2019), the disclosure of which is incorporated by reference herein for all purposes as if fully set forth.

FIELD OF THE INVENTION

The present invention relates to a multilayer article comprising at least a first layer of a first thermoplastic polyurethane (TPU) resin composition; a second layer of a second TPU resin composition; and a core layer between the first layer and the second layer, wherein the core layer comprises at least one layer of a barrier resin composition, and wherein the barrier resin composition comprises an ethylene vinyl alcohol copolymer (EVOH) (A); a hydroxyl group-containing compound (B) having (i) a molecular weight of 200 or less, (ii) a ratio of a number of hydroxyl groups in one molecule relative to the molecular weight of from 0.02 to 0.03, and (iii) a melting point from about 23° C. to about 200° C.; and a fatty acid metal salt (C). The multilayer article has good elasticity, stretchability and barrier properties, which are particularly suitable for chemical-resistant clothing articles such as suits and gloves.

BACKGROUND OF THE INVENTION

EVOH is a crystalline polymer combining the excellent gas barrier and organic solvent-resistance properties of polyvinyl alcohol, with melt processability and water resistance of polyethylene, and is applied in an extensive range of applications. EVOH, however, generally shows high stiffness and low stretchability at room temperature, which limits its use.

In order to improve stretchability of EVOH at room temperature, it has been proposed to add a plasticizer. Conventionally, plasticizers used for EVOH resin are propanediol, butanediol, pentanediol, propanetriol, glycerol and the like; however, due to their low melting points, they tend to bleed out at high temperature/high humidity, resulting in impaired performance during storage. U.S. Pat. No. 10,053,551B2 describes a resin composition comprising EVOH and a hydroxyl group-containing compound as plasticizer, such as 1,1,1-trimethylolpropane, 1,1,1-trimethylolmethane, trimethylolmethane, tetramethylolmethane (pentaerythritol) and the like, which has a higher melting point and has less tendency to bleed out at high temperature/high humidity. US20170326852A1 describes a silage film having a layer of such a resin composition, which has good oxygen transmission rate and stretchability.

The multilayer film described in the publication, which has a polyolefin-based resin such as PE for the outer layers, does not have sufficient elasticity for some applications such as chemical suits and gloves, which require elasticity and barrier performance after stretching for a multilayer article in order to secure its quality.

Also, there is a concern about delamination between a barrier layer and other layers due to stress during stretching; therefore, in addition to the stretchability of the barrier layer, good interlayer adhesion strength is also expected for such a multilayer article.

The present invention provides a multilayer article having a desirable combination of good elasticity, stretchability and barrier properties after stretching, which is required for applications such as chemical-resistant clothing like, for example, suits and gloves.

SUMMARY OF THE INVENTION

In view of the above background, an objective of the present invention is to provide a multilayer article having good elasticity, stretchability and excellent barrier properties required for applications under abusive conditions.

The present invention addresses the above-described problem by providing a multilayer article comprising the structure $(U_1)/(X_1)/(U_2)/((X_{n+1})(U_{n+2}))_n$, wherein:

n is a whole number from 0 to 50;

$(U_1)$ is a first layer of a first thermoplastic polyurethane resin composition;

$(U_2)$ is a second layer of a second thermoplastic polyurethane resin composition;

$(X_1)$ is a first core layer;

each $(U_{n+2})$ is independently an (n+2) layer of a thermoplastic polyurethane resin composition;

each $(X_{n+1})$ is independently an (n+1) core layer; and each core layer is independently a layer of a barrier resin composition comprising:

an ethylene vinyl alcohol copolymer (A);

a hydroxyl group-containing compound (B) having a molecular weight of 200 or less, a ratio of a number of hydroxyl groups per molecule to the molecular weight of from 0.02 to 0.03, and a melting point of from about 23° C. to about 200° C.; and a fatty acid metal salt (C).

In one embodiment, the hydroxyl group-containing compound (B) is contained in the barrier resin composition in an amount of from about 3 mass % to about 15 mass % based on the total mass of the barrier resin composition.

In another embodiment, the fatty acid metal salt (C) is contained in the barrier resin composition in an amount of from about 10 to about 250 ppm in terms of metal element.

In another embodiment, the hydroxyl group-containing compound (B) is 1,1,1-trimethylolpropane.

In another embodiment, the metal element of fatty acid metal salt (C) is magnesium.

In another embodiment, a total layer thickness of the multilayer article ranges from about 10 μm to about 1000 μm.

In another embodiment, a thickness ratio of the core layer in the total layer thickness of the multilayer article ranges from about 1% to about 20%.

In one embodiment, the multilayer article has a structure $(T1)/(U_1)/(X_1)/(U_2)/((X_{n+1})/(U_{n+2})_n(T2)$, wherein:

each of (T1) and (T2) is independently one or more layers of one or more other thermoplastic resin compositions, and one of (T1) or (T2) is optional.

In all of the above structures, $(U_1)$, $(U_2)$ and $(U_{n+2})$ can be a layer of the same or different thermoplastic polyurethane resin composition. For example, when n=1, $(U_1)$, $(U_2)$ and $(U_3)$ can all be the same, two can be the same and one can be different, or all three can be different TPU resin compositions.

Likewise, $(X_1)$ and $(X_{n+1})$ can be a core layer of the same or different barrier resin composition. For example, when n=1, $(X_1)$ and $(X_2)$ can be the same or different barrier resin compositions.

Still further, in broadest aspects as indicated above, (T1) and (T2) are optional, and one or both may be present. Each of (T1) and (T2) is independently a single layer or multilayer of one or more other thermoplastic resin compositions.

In another embodiment, n=0 and (T1) and (T2) are not present, so the multilayer article is a 3-layer structure $(U_1)/(X_1)/(U_2)$. Again, $(U_1)$ and $(U_2)$ can be a layer of the same or different thermoplastic polyurethane resin composition (first and second TPU resin compositions can be the same or different).

In another embodiment, n=0 and one of (T1) and (T2) is present so the multilayer article has a 4-layer structure $(U_1)/(X_1)/(U_2)/(T_2)$ or $(T_1)/(U_1)/(X_1)/(U_2)$. Again, $(U_1)$ and $(U_2)$ can be a layer of the same or different thermoplastic polyurethane resin composition (first and second TPU resin compositions can be the same or different).

In another embodiment, n=0 and both (T1) and (T2) are present, so the multilayer article has a 5-layer structure $(T1)/(U_1)/(X_1)/(U_2)/(T2)$. Again, each of $(U_1)$ and $(U_2)$ may be the same or different thermoplastic polyurethane resin compositions.

In another embodiment, n is a whole number from 1 to 50, or to 25, and (T1) and (T2) are not present.

In another embodiment, n is a whole number from 1 to 50, or to 25, and one of (T1) and (T2) is present.

In another embodiment, n is a whole number from 1 to 50, or to 25, and both of (T1) and (T2) are present.

In another embodiment, a chemical-resistant article of clothing comprises the said multilayer article.

In another embodiment, the chemical-resistant article is a suit.

In another embodiment, the chemical-resistant article is a glove.

According to the aspects of the present invention, a multilayer article is provided having good elasticity, stretchability and excellent barrier properties required for the application under abusive conditions. In one embodiment, the present invention provides a chemical-resistant article of clothing, such as a glove or suit, comprising or made from such multilayer article.

These and other embodiments, features and advantages of the present invention will be more readily understood by those of ordinary skill in the art from a reading of the following detailed description.

DETAILED DESCRIPTION

The present invention relates to a multilayer article having at least one layer of a barrier polymer comprising an ethylene-vinyl alcohol copolymer and specified functional additives. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

In the above structures, the presence of the slash ("/") means that the components on each side of the slash are in contact with one another. For example, in the structure $(U_1)/(X_1)/(U_2)$, $(X_1)$ is in contact with $(U_1)$ on one side and $(U_2)$ on the other side.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Barrier Resin Composition (EVOH Blend)
Ethylene-Vinyl Alcohol Copolymer (A)

The barrier resin composition (EVOH Blend) in the multilayer article of the present invention comprises an ethylene-vinyl alcohol copolymer (EVOH (A)), a hydroxyl group-containing compound (B) and a fatty acid metal salt (C). The EVOH (A) is a copolymer primarily composed of ethylene units and vinyl alcohol units. The EVOH (A) can be obtained by saponification of a copolymer of ethylene and a vinyl ester with the use of an alkaline catalyst or the like, for example. Typical examples of the vinyl ester include vinyl acetate, and other fatty acid vinyl esters (such as vinyl propionate and vinyl pivalate) can also be used.

The EVOH (A) can contain an additional comonomer copolymerized thereto, such as propylene, butylene, an unsaturated carboxylic acid or an ester thereof, a vinylsilane compound, and N-vinylpyrrolidone, provided that the objects of the present invention are not impaired.

The lower limit of ethylene units in the EVOH (A) is preferably about 20 mol %, or about 25 mol %, or about 40 mol %. The upper limit of ethylene units in the EVOH (A) is preferably about 60 mol %, or about 55 mol %, or about 50 mol %. When the ethylene unit is less than about 20 mol %, the resin composition is poor in melt moldability and a suitable film may not be obtained. When the ethylene unit rate is greater than about 60 mol %, the oxygen barrier property of the resulting film may be inadequate.

From the viewpoint of maintaining oxygen barrier property of the resulting multilayer article, the saponification degree of the EVOH (A) is preferably greater than or equal to about 90 mol %, or greater than or equal to about 95 mol %, or greater than or equal to about 99 mol %.

From the viewpoint of thermal stability of the resin composition during melt molding, the amount of 1,2-glycol bonded to the EVOH (A) is preferably less than about 1.8 mol %, or less than 1.5 about mol %, or less than about 1.0 mol %. The amount of bonded 1,2-glycol is preferably and most easily controlled by the polymerization temperature. For example, the polymerization is conducted preferably at from about 40° C., or from about 50° C., to about 120° C., or to about 100° C. The amount of bonded 1,2-glycol is represented by the ratio of monomer units contributing to the bonding relative to the total amount of monomer units.

Regarding the melt viscosity of the EVOH (A), the lower limit of the melt flow rate (MFR) at 190° C. and 2160 g load is preferably about 0.1 g/10 minutes, or about 0.5 g/10 minutes, and the upper limit is preferably about 50 g/10 minutes, or about 20 g/10 minutes. When the EVOH (A) has such melt viscosity, melt processability of the resin composition can be further enhanced.

Only one type of the EVOH (A) can be used, or two or more types thereof can be used as a mixture.

Hydroxyl Group-Containing Compound (B)

The barrier resin composition in the multilayer article of the present invention contains a hydroxyl group-containing compound (B) that satisfies the following requirements: (i) a molecular weight of less than or equal to 200, (ii) a ratio of number of hydroxyl groups per molecule to the molecular weight ranging from 0.02 to 0.03, and (iii) a melting point of from about 23° C. to about 200° C.

When the hydroxyl group-containing compound (B) satisfying these requirements is used in combination with the EVOH (A), the resulting multilayer article can have excellent oxygen barrier property (a low oxygen transmission rate) and excellent stretchability as proven in the examples section below. It is believed that such a hydroxyl group-containing compound functionally acts as a plasticizer for the EVOH (A), even though such a compound is not typically associated with plasticizer functionality.

The hydroxyl group-containing compound (B) used in the present invention has a molecular weight of less than or equal to 200 as described above. If a hydroxyl group-containing compound having a molecular weight of greater than 200 (such as 1,14-tetradecanediol (molecular weight: 230), 1,16-hexadecanediol (molecular weight: 258), ditrimethylolpropane (molecular weight: 250), dipentaerythritol (molecular weight: 254), or tripentaerythritol (molecular weight: 372)) is used, phase separation is caused due to the poor compatibility with the EVOH (A), and it does not act as a plasticizer. For the hydroxyl group-containing compound (B) to be excellently compatible with the EVOH (A) and thereby act as a plasticizer, the lower limit of molecular weight of the hydroxyl group-containing compound (B) is preferably 50, or 75, and the upper limit is preferably 180, or 150. The molecular weight of the hydroxyl group-containing compound (B) is calculated by adding up mass numbers of all the constituent elements thereof.

The hydroxyl group-containing compound (B) used in the present invention has a ratio of number of hydroxyl groups per molecule to the molecular weight (or, a ratio of (number of hydroxyl groups per molecule)/(molecular weight)) ranging from 0.02 to 0.03 as described above. If a hydroxyl group-containing compound having a ratio of (number of hydroxyl groups per molecule)/(molecular weight) of less than 0.02 (such as 1,5-pentanediol (ratio of (number of hydroxyl groups per molecule)/(molecular weight): 0.019), 1,6-hexanediol (ratio of (number of hydroxyl groups per molecule)/(molecular weight): 0.017), or 1,7-heptanediol (ratio of (number of hydroxyl groups per molecule)/(molecular weight): 0.015)) is used as the hydroxyl group-containing compound (B), the interaction with the EVOH (A) becomes poor and thereby it is not effective enough as a plasticizer. In this case, the resulting resin composition may have a high glass transition temperature and the resulting multilayer article may have a high tensile modulus of elasticity, which are unfavorable. Being insufficiently compatible with the EVOH (A), the hydroxyl group-containing compound may cause poor tensile elongation at break or high oxygen transmission rate (OTR) or a patchy appearance of the resulting film, which is undesirable. If a hydroxyl group-containing compound having a ratio of (number of hydroxyl groups per molecule)/(molecular weight) of greater than 0.03 (such as 1,2,3-propanetriol (ratio of (number of hydroxyl groups per molecule)/(molecular weight): 0.033) or erythritol (ratio of (number of hydroxyl groups per molecule)/(molecular weight): 0.033)) is used, the hydroxyl group-containing compound (B) inhibits crystallization of the EVOH (A), and thus the resulting multilayer article has high oxygen transmission rate. Furthermore, because the resulting multilayer article becomes highly hygroscopic, the mobility of hydroxyl group-containing compound (B) is enhanced in the multilayer article and that causes unfavorable bleed-out at high humidity. For the resulting multilayer article to have a low oxygen transmission rate, a low glass transition temperature, and excellent flexibility, the lower limit of the ratio of (number of hydroxyl groups per molecule)/(molecular weight) is preferably 0.021, or 0.022, and the upper limit is preferably 0.025, or 0.023.

The hydroxyl group-containing compound (B) used in the present invention has a melting point (Tm) of from about 23° C. to about 200° C. When a hydroxyl group-containing compound having a melting point of less than about 23° C. (such as 1,2-propylene glycol (melting point: −59° C.), 1,4-propylene glycol (melting point: −27° C.), 1,4-butanediol (melting point: 20° C.), or 1,5-pentanediol (melting point: −18° C.)) is used, the resulting molded article may exhibit bleed-out, which is unfavorable. A hydroxyl group-containing compound with a moderately low melting point is considered to be highly effective in enhancing mobility of the chains of the EVOH (A) when mixed with the EVOH, and therefore the upper limit of the melting point of the hydroxyl group-containing compound (B) is about 200° C., or about 100° C. The melting point of the hydroxyl group-containing compound (B) is measured in accordance with JIS K 0064.

The hydroxyl group-containing compound (B) is preferably contained in the barrier resin composition in an amount ranging from about 3% to about 15% by mass, based on the total mass of the barrier resin composition. When the content of the hydroxyl group-containing compound (B) in the resin composition is less than about 3% by mass, the hydroxyl group-containing compound is not effective enough as a plasticizer, leading to a high glass transition temperature and a high tensile modulus of elasticity of the resulting multilayer article at room temperature, which are unfavorable. When the content of the hydroxyl group-containing compound (B) in the resin composition is greater than about 15% by mass, the resulting multilayer article has a low oxygen transmission rate or may have poor tensile elongation at break, which is also unfavorable. For the hydroxyl group-containing compound to be effective enough as a plasticizer, the resulting resin composition to have a low glass transition temperature, and the resulting multilayer article to have excellent flexibility and to retain a low oxygen transmission rate, the lower limit of the content of the hydroxyl group-containing compound (B) in the resin composition is preferably about 5% by mass, or about 6% by mass, and the upper limit is preferably about 12% by mass, or about 10% by mass.

Examples of the hydroxyl group-containing compound (B) having the molecular weight, the ratio of (number of hydroxyl groups per molecule)/(molecular weight), and the melting point described above include 1,1,1-trimethylolpropane, 1,1,1-trimethylolethane, trimethylolmethane, and tetramethylolmethane (pentaerythritol). Among these, 1,1,1-trimethylolpropane and 1,1,1-trimethylolethane are preferable and 1,1,1-trimethylolpropane is particularly preferable to give the resulting molded article a high glass transition temperature and excellent flexibility and to retain a low oxygen transmission rate.

The resin composition comprising the EVOH (A) and the hydroxyl group-containing compound (B) in the multilayer article of the present invention may further contain, in addition to the EVOH (A) and the hydroxyl group-containing compound (B), a known additive typically contained in the EVOH (A), such as a heat stabilizer, an antioxidant, an antistatic agent, a colorant, an ultraviolet absorber, a lubricant, a plasticizer, a light stabilizer, a surfactant, an antimicrobial agent, a desiccating agent, an anti-blocking agent, a flame retardant, a crosslinking agent, a curing agent, a foaming agent, a nucleating agent, an anti-fogging agent, an additive to give biodegradability, a silane coupling agent, and an oxygen absorbent, provided that the effects of the present invention are not impaired.

The glass transition temperature (Tg) of the barrier resin composition containing the EVOH (A) and the hydroxyl group-containing compound (B) in the multilayer article of the present invention preferably has a lower limit of about 10° C., or about 20° C., and preferably has an upper limit of about 50° C., or about 40° C. When the glass transition temperature of the barrier resin composition is less than about 10° C., the oxygen transmission rate of the resulting multilayer article tends to be high. When the glass transition temperature of the resin composition is greater than about 50° C., flexibility of the resulting multilayer article tends to be poor.

For ease of melt molding, the melting point (Tm) of the barrier resin composition containing the EVOH (A) and the hydroxyl group-containing compound (B) in the multilayer article of the present invention preferably has a lower limit of about 100° C., or about 120° C., and preferably has an upper limit of about 200° C., or about 180° C.

Fatty Acid Metal Salt (C)

The barrier resin composition contains a fatty acid metal salt (C). The cationic species of the fatty acid metal salt (C) is not particularly limited and includes, for example, magnesium salts, calcium salts and barium salts. Magnesium salts are preferred. The anionic species of the fatty acid metal salt (C) is also not particularly limited and includes, for example, carbonates, hydrogen carbonates, phosphates, hydrogen phosphate and hydroxide, and can be added as a carboxylic acid salt. Carbonates, bicarbonates, hydrogen phosphates and hydroxides are preferred.

The barrier resin composition of the present invention contains the fatty acid metal salt (C) in an amount of from about 10 to about 250 ppm in terms of metal element. By blending the fatty acid metal salt, the interlayer adhesion to the thermoplastic polyurethane resin layer is improved. When the content of the fatty acid metal salt (C) exceeds about 250 ppm in terms of metal element, the coloration at melting is remarkable, and voids or perforations readily occur, thus about 150 ppm or less, or about 100 ppm or less, is preferred. On the other hand, when the content of the fatty acid metal salt (C) is less than about 10 ppm in terms of metal element, the effect of improving the interlayer adhesion may be unsatisfactory. About 20 ppm or more is preferred.

Optional Components
Boron Compound

The boron compound inhibits gelation in the melt molding, and additionally inhibits a torque fluctuation of an extrusion molding machine or the like, i.e., a variation of a viscosity during heating. Examples of the boron compound include boric acids such as orthoboric acid, metaboric acid and tetraboric acid; boric acid esters such as triethyl borate and trimethyl borate; boric acid salts such as alkali fatty acid metal salts and alkaline earth fatty acid metal salts of the aforementioned boric acids, and borax; boron hydrides; and the like. Of these, boric acids are preferred, and orthoboric acid is more preferred.

When present, the lower limit of the content of the boron compound in the resin composition is preferably about 100 ppm, and the upper limit of the content of the boron compound is preferably about 5,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and consequently the appearance of the formed article may be deteriorated.

Acetic Acid

Acetic acid prevents the coloring of the formed article, and additionally inhibits gelation during melt molding.

When present, the lower limit of the content of acetic acid in the resin composition is preferably about 50 ppm, or about 100 ppm, or about 150 ppm, or about 200 ppm, and the upper limit of the content of acetic acid is preferably about 1,000 ppm, or about 500 ppm, or about 400 ppm. When the content of acetic acid is less than the lower limit, sufficient coloring preventive effects may not be achieved, and yellowing of the formed article may occur. On the other hand, the content of acetic acid is greater than the upper limit, gelation is likely to occur in the melt molding, in particular, in melt molding over a long time period, and consequently the appearance of the formed article may be deteriorated.

Phosphorus Compound

The phosphorus compound inhibits the coloring and the generation of defects such as streaks and fish eyes, and additionally improves the long-run workability. Examples of the phosphorus compound include various types of phosphoric acids such as phosphoric acid and phosphorous acid, phosphates, and the like. The phosphate may be in any form of a monobasic phosphate salt, a dibasic phosphate salt and a tribasic phosphate salt. In addition, the cationic species contained in the phosphate is not particularly limited, and alkali fatty acid metal salts and alkaline earth fatty acid metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred.

When present, the lower limit of the content of the phosphorus compound in the resin composition is preferably about 1 ppm, and the upper limit of the content of the phosphorus compound is preferably about 200 ppm. When the content of the phosphorus compound is less than the lower limit, or when the content of the phosphorus compound is greater than the upper limit, the thermal stability may be deteriorated, and the coloring and the occurrence of gelation are likely to occur in the melt molding over a long time period.

Other Optional Components

The resin composition may contain other optional components, within a range not leading to impairment of the effects of the present invention. The other optional components are exemplified by an alkali metal, an antioxidant, an UV absorbent, a plasticizer, an antistatic agent, a lubricant, a colorant, a filler, a heat stabilizer, other resin, and the like. The resin composition may contain two or more types of these optional components, and when present the total content of the optional component is preferably about 1% by mass or less with respect to the total mass of the barrier resin composition.

Examples of the alkali metal include lithium, sodium, potassium, and the like. When present, the lower limit of the content of the alkali metal in the resin composition is preferably about 20 ppm, or about 50 ppm, and the upper limit of the content is preferably about 1,000 ppm, or about 500 ppm, in terms of metal element equivalent.

Overall, the total content of alkali metal and alkaline earth metal combined should be limited and not exceed about 1000 ppm, or about 750 ppm, or about 500 ppm, in terms of metal element equivalent.

It is to be noted that in order to inhibit gelation, for example, a hindered phenol compound, a hindered amine compound, a hydrotalcite compound or the like may be added. These may be used either alone, or two or more types thereof may be used in combination. When present, the amount of the compound added to inhibit the gelation is typically about 0.01% by mass or greater, and about 1% by mass or less, based on the total mass of the barrier resin composition.

Ratio of the total amount of EVOH (A), the hydroxyl group-containing compound (B) and the fatty acid metal salt (C) in the resin composition is preferably about 50% by mass or more, or about 70% by mass or more, or about 90% by mass or more, or about 95% by mass or more. In one embodiment, the resin composition consists essentially of EVOH (A), the hydroxyl group-containing compound (B) and the fatty acid metal salt (C).

Preparation of Barrier Resin Composition (EVOH Blend)

The barrier resin composition comprising the EVOH (A), the hydroxyl group-containing compound (B) and fatty acid metal salt (C) in the multilayer article of the present invention can be produced by mixing the components by a known method, such as melt mixing, solution mixing, or mechanical mixing, and then molding the obtained mixture by a known method. As an examples of melt mixing, dry blending the components and followed by melt mixing of the obtained blend. A known melt-kneading apparatus such as a kneader/extruder, an extruder, a mixing roll, a Banbury mixer, or a plastomill can be used, and typically and industrially preferably, a single or twin screw extruder is used. When needed, some apparatuses such as a vacuum pump, a gear pump, and/or a screen mesh are preferably equipped. Examples of the technique of solution mixing include a technique involving dissolving and mixing the components in a common good solvent and then allowing precipitation to occur in a common poor solvent. After melt mixing or solution mixing, the resulting resin can be shaped into a powder form, a spherical or cylindrical pellet form, a flaky form, or in other forms for use. Although there is also a method of adding by immersing the pellets in an aqueous solution, the normal fatty acid metal salt (C) of the above are often poorly soluble in water, thus the method of blending while melting and kneading the EVOH resin described above is more desirable.

Thermoplastic Polyurethane Resin Composition

The multilayer article in the present invention comprise at least one barrier resin composition layer and at least two thermoplastic polyurethane (TPU) layers. Polyurethane resin compositions used in TPU layers for chemical-resistant articles are in general well-known to those of ordinary skill in the relevant art.

Typically, the polyurethane resin used for the TPU layer consists of 2 or 3 components such as high molecular weight diol (such as a polymeric diol) and organic diisocyanate, and/or low molecular weight diol (such as a monomeric and/or oligomeric diol). Specific examples of each component are described below.

A polymermeric diol is a diol polymer compound typically obtained by polycondensation, addition polymerization (for example, ring-opening polymerization), polyaddition, or the like. Typical examples like polyester diols, polyether diols, polycarbonate diols or their co-condensates (for example, polyester, polyether diol) can be mentioned. These may be used alone, or may be used by mixing two or more kinds.

Examples of polyester diols include those that may be obtained from aliphatic diols such as ethylene glycol, propylene glycol and 1,5-pentanediol, or mixtures thereof, and an aromatic dicarboxylic acid (such as terephthalic acid) and/or or aliphatic acids such as glutaric acid and adipic acid, and various mixtures. Alternatively, a polylactone diol such as polycaprolactone glycol, polypropiolactone lactone glycol, polyethylene glycol valerolactone can be preferably used.

The polyalkylene ether diols include, for example, polyethylene ether glycol, polytetramethylene ether glycol, and polyhexamethylene ether glycol.

Polycarbonate diols can be obtained by condensation polymerization by the action of phosgene or diphenyl carbonate in aliphatic diols that have carbon number of 2 to 12, such as 1,4-butanediol, 1,5-pentanediol, 1,6-hexanediol, 1,8-octanediol and 1,10-decane diol, and mixtures thereof.

Typical average molecular weight of the polymeric diol is from about 500 to about 3000, or to about 2000. When the average molecular weight is too small, compatibility with the organic diisocyanate may be too high and the elasticity of the resulting polyurethane can be poor. On the other hand, when the average molecular weight is too large, the compatibility with the organic diisocyanate is too low and mixing in the polymerization process can be difficult, resulting in gel-like lumps or stablility issues with the polyurethane.

The low molecular weight diol has a molecular weight of less than about 500, and includes, for example, aliphatic, alicyclic or aromatic diols such as ethylene glycol, propylene glycol, 1,4-butanediol, 1,5-pentanediol, 3-methyl pentane glycol, 1,6-hexanediol and 1,4-bis-hydroxyl ethylbenzene. Low molecular weight diols may also include oligomers made from components described above for the polymeric diols. All of the above may be used alone or in a combination of two or more.

Aromatic, alicyclic or aliphatic diisocyanates such as 4,4-diphenylmethane diisocyanate, tolylene diisocyanate, 1,4-bis-(isocyanate methyl)benzene, 1,4-bis-(isocyanate methyl) cyclohexane, 4,4- or 1,3-aromatic dicyclohexyl methane diisocyanate, and isophorone diisocyanate can be used as organic diisocyanates. These may be used alone or be used in a combination of two or more.

The nitrogen atom content of the polyurethane resin used in the present invention is determined by appropriately selecting the proportions of high molecular weight diol, low molecular weight diol and organic diisocyanate, but practically it is preferably used in the range of from about 1 mass % to about 7 mass %. Moreover, when preparing a thermoplastic polyurethane resin, a suitable catalyst which promotes reaction of organic diisocyanate and diol may also be used as needed. Also, depending on the purpose, various additives or lubricants such as colorants, fillers, antioxidants, UV absorbers, etc. can be added.

The ratio of the thermoplastic polyurethane resin in the thermoplastic polyurethane resin composition is preferably about 50% by mass or more, or about 70% by mass or more, or about 90% by mass or more, or about 95% by mass or more. In one embodiment, the resin composition consists essentially of the thermoplastic polyurethane resin.

Optional Thermoplastic Layers

Additionally, other thermoplastic layers can be incorporated into the multilayer articles. A resin contained in other constituent layers of the multilayer article of the present invention, which are not the layers of the barrier resin composition and TPU resin composition, are not particularly limited. Examples of suitable thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-20 α-olefin) copolymers; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; halogenated polyolefins such as chlorinated polyethylenes and chlorinated polypropylenes; and aromatic and aliphatic polyketones. In terms of mechanical strength and molding processability, polyolefin resins, polyester resin and poly amide resin are preferable.

Multilayer Articles

The multilayer article of the present invention generally comprises at least a first layer comprising a first thermoplastic polyurethane (TPU) resin composition, the first layer having an inner surface and an outer surface; a second layer comprising a second TPU resin composition, the second layer having an inner surface and an outer surface; and a core layer between the first layer and the second layer, the core layer comprising a barrier resin composition, the core layer having an upper surface in contact with the first inner surface of the first layer and a lower surface in contact with the second inner surface of the second layer. The first and second TPU resin compositions may be the same of different.

The layer configuration of the multilayer structure is exemplified by the following layer configurations, wherein: each (X) independently represents a layer composed of the barrier resin composition according to the embodiment of the present invention; each (U) independently represents a layer composed of a thermoplastic polyurethane resin; and each (T) independently represents a layer composed of another thermoplastic resin composition.

3 layers: $(U_1)/(X_1)/(U_2)$,
4 layers: $(U_1)/(X_1)/(U_2)/(T_1)$,
5 layers: $(U_3)/(U_1)/(X_1)/(U_2)/(U_4)$, $(T_1)/(U_1)/(X_1)/(U_2)/(T_2)$ Co-extrusion, dry lamination, extrusion lamination, co-push lamination, etc. can be adopted to laminate the barrier resin composition layer and the thermoplastic polyurethane (TPU) layer and other thermoplastic layer of the present invention. The co-extrusion method is most preferable for laminating the barrier resin composition layer and the thermoplastic polyurethane layer.

The thickness of the layer constituting the multilayer structure is not particularly limited, and may be appropriately selected according to the characteristics of other components forming the multilayer structure, the number of layers in the entire multilayer structure, the molding method and the application of the multilayer structure, etc.

Total thickness of the film is preferably from about 10 to about 1000 μm, each TPU layer is preferably from about 5 to about 500 μm per layer, and the barrier (EVOH) layer is preferably form about 1% to about 20% of the total thickness.

The multilayer article is suitable for use in chemical-resistant clothing such as suits and gloves, bladders for liquid packaging under abusive conditions, inflatables requiring retention of air pressure, and linings for laminated bags for odor reduction.

EXAMPLES

The present invention is more specifically described by way of examples. The scope of the present invention, however, is not limited to these examples. It is to be noted that production methods as well as methods of measurement, calculation and evaluation in Examples and Comparative Examples are each as described below.

Materials
EVOH (A): EVOH-1: EVAL™ E171B, Ethylene-Vinyl Alcohol copolymer commercially available from Kuraray Co., Ltd. (ethylene content 44 mol %, a degree of saponification 99.9 mol %, MFR of 1.7 g/10 minutes (190° C., 2160 g)).

Hydroxyl Group-Containing Compound (B): 1,1,1-trimethylolpropane (TMP)

Fatty acid metal salt (C): Magnesium Stearate (St-Mg)
Ethylene Unit Content and Saponification Degree of EVOH
Measurement was conducted by 1H-NMR measurement (JNM-GX-500, JEOL Ltd., Tokyo Japan) using DMSO-d6 as a solvent.

Example 1

92 parts by mass of EVOH-1, 8 parts by mass of TMP and 0.12 parts by mass of St-Mg were blended. The resulting blend was subjected to melt compounding, pelletizing and drying under the following conditions, and then EVOH blend-1 was obtained.

Apparatus: 30 mmD twin screw extruder (TEX-30α manufactured by The Japan Steel Works, Ltd.)
L/D: 45 Screw: co-rotating full-intermeshing type
Number of die holes: 4 holes (3 mmD)
Extrusion temperature (° C.): C2=180, C3=200, C4-C13=220, Die=220
Rotation speed: 200 rpm
Output: about 20 kg/hr
Drying: hot air drying at 80° C. for 6 hr
Determination of Amount of Fatty Acid Metal Salt in Resin Composition Pellet Into a Teflon (trademark of The Chemours Company) pressure container, 0.5 g of the resin composition pellets were charged, and 5 mL concentrated nitric acid was added thereto, whereby the resin composition pellets were decomposed at room temperature for 30 min. After a lapse of 30 min, the container was covered with a lid, a first heat treatment was carried out at 150° C. for 10 min, then a subsequent heat treatment was carried out at 180° C. for 5 min, by using a wet degradation device ("MWS-2" available from Actac Project Service Corporation), to permit degradation, and then the mixture was cooled to room temperature. The treatment liquid thus obtained was transferred to a 50-mL volumetric flask (TPX) and diluted with pure water to 50 mL. Metals contained in the solution were analyzed by using an ICP optical emission spectrophotometer ("OPTIMA4300DV" available from PerkinElmer Inc.), whereby the content of metal element from the fatty acid metal salt was determined. The fatty acid salt content was calculated from the content of metal element.

Melt Flow Rate (MFR)
The discharging rate (g/10 minutes) of a sample was measured by a melt flow indexer (MP1200, Tinius Olsen TMC, Horsham, Pa. USA) under conditions of a temperature at 190° C. and with a load of 2160 g.

Production of Multilayer Article
Layer Structure
2-material-3-layer (TPU/EVOH blend/TPU)
Apparatus: 5 extruder-7 layer cast film extruder (manufactured by Davis standard)
Extruder A: 38-mmφ single screw extruder (L/D=30)
Extruder B: 50-mmφ single screw extruder (L/D=24)
Extruder C: 38-mmφ single screw extruder (L/D=24)
Extruder D: 25-mmφ single screw extruder (L/D=24)
Extruder E: 38-mmφ single screw extruder (L/D=24)
Die: 762 mm width (manufactured by Cloeren)
Layer configuration: A/B/C/D/C/B/E
Material
Extruder A, B, C, E: Elastollan SP806 produced by BASF corporation+2% 016LB15 PU CC produced by PolyOne corporation
Extruder D: EVOH blend
Temperature setting (° C.):
Extruder A: Z1=182, Z2=188, Z3=193, Z4=193, Z5=193, A1=193, A2=193
Extruder B: Z1=182, Z2=188, Z3=193, Z4=193, A1=193, A2=193
Extruder C: Z1=182, Z2=188, Z3=193, Z4=193, A1=193, A2=193
Extruder D: Z1=168, Z2=182, Z3=193, A1=193, A2=193
Extruder E: Z1=182, Z2=188, Z3=193, Z4=193, A1=193, A2=193
Feedblock: Z1-Z3=196
Die: Z1-Z6=196

Cooling roll temperature: 40° C.
Line speed: 15.2 m/min

Measuring of Thickness of the Multilayer Article

Samples were collected from center of width of the multilayer article. Collected samples were cut by knife and sliced by microtome. Layer thickness was measured by microscope (manufactured by Nikon). The results are shown in Table 1.

Total film thickness: 190 μm
EVOH blend thickness: 8 μm

Adhesion Strength

TPU/EVOH blend/TPU multilayer article was cut by 15 mm width. Then, interface between TPU and EVOH was peeled off. Adhesion strength was measured by using tensile tester (Model 4466, Instron, Norwood, Mass. USA) at tensile speed of 250 mm/min. The result is shown in Table 1.

Elongation Ratio After 200% Stretch

TPU/EVOH blend/TPU multilayer article was cut to standard A4 size. Grid was marked on the article and length of the grid was measured. Then, the article was stretched by 200% using an elongation tool. After recovered from the stretch, the length of the grid was measured again. Elongation ration was calculated by formula below. The result is shown in Table 1.

Elongation ratio: La-Lb/Lb×100 wherein Lb is length before stretch, La is length after stretch

Oxygen Transmission Rate (OTR) Before/After Stretch

The multilayer articles before and after stretch were conditioned at 20° C. and 65% RH for three days, and after that, the oxygen transmission rate was measured using "OX-TORAN MODEL 2/21" manufactured by MOCON, Inc. in the same conditions. The results are shown in Table 1.

Example 2

Example 1 was repeated, except that 95 parts by mass of EVOH-1, 5 parts by mass of TMP and 0.12 parts by mass of St-Mg were blended as shown in Table 1.

The test results are shown in Table 1.

Example 3

Example 1 was repeated, except that 88 parts by mass of EVOH-1, 12 parts by mass of TMP and 0.12 parts by mass of St-Mg were blended as shown in Table 1.

The test results are shown in Table 1.

Example 4

Example 1 was repeated, except that 92 parts by mass of EVOH-1, 8 parts by mass of TMP and 0.06 parts by mass of St-Mg were blended as shown in Table 1.

The test results are shown in Table 1.

Example 5

Example 1 was repeated, except that 92 parts by mass of EVOH-1, 8 parts by mass of TMP and 0.18 parts by mass of St-Mg were blended as shown in Table 1.

The test results are shown in Table 1.

Comparative Example 1

Example 1 was repeated, except that 100 parts by mass of EVOH-1 and 0.12 parts by mass of St-Mg were blended without blending of TMP as shown in Table 1.

The test results are shown in Table 1.

Comparative Example 2

Example 1 was repeated, except that 92 parts by mass of EVOH-1, 8 parts by mass of TMP were blended without blending of St-Mg as shown in Table 1.

The test results are shown in Table 1.

As shown in Table 1, Example 1 to 5 displayed excellent adhesion strength, elongation ratio after 200% stretch, OTR after 200% stretch meaning good elasticity, stretchability and barrier properties.

On the other hand, Comparative Example 1 which does not contain TMP showed inferior elongation ratio and OTR after stretch as compared to Examples 1-5.

Comparative Example 2 which does not contain St-Mg showed weak adhesion and delamination after stretch as compared to Examples 1-5.

TABLE 1

| | EVOH (A) | | Hydroxyl Group-Containing Compound (B) | | Fatty Acid Metal Salt (C) | | | | Total Thick. μm | Layer Thick. μm | Ad. Strength g/15 mm | Elongation Ratio after 200% Stretch % | OTR 20° C./ 65% RH cc/m2. day.atm | OTR after 200% Stretch 20° C./ 65% RH cc/m2. day.atm |
|---|---|---|---|---|---|---|---|---|---|---|---|---|---|---|
| | grade | Parts by mass | grade | Parts by mass | grade | PHR | as Mg ppm | Structure | | | | | | |
| EX 1 | EVOH-1 | 92 | TMP | 8 | St-Mg | 0.12 | 48 | TPU/EVOH blend/TPU | 190 | 8 | 1020 | 5.0 | 8.1 | 8.3 |
| EX 2 | EVOH-1 | 95 | TMP | 5 | St-Mg | 0.12 | 48 | TPU/EVOH blend/TPU | 193 | 8 | 1000 | 6.0 | 7.1 | 7.4 |
| EX 3 | EVOH-1 | 88 | TMP | 12 | St-Mg | 0.12 | 48 | TPU/EVOH blend/TPU | 190 | 8 | 980 | 3.0 | 9.4 | 9.5 |
| EX 4 | EVOH-1 | 92 | TMP | 8 | St-Mg | 0.06 | 24 | TPU/EVOH blend/TPU | 191 | 8 | 850 | 5.0 | 7.8 | 7.9 |
| EX 5 | EVOH-1 | 92 | TMP | 8 | St-Mg | 0.18 | 72 | TPU/EVOH blend/TPU | 189 | 8 | 1200 | 6.0 | 8.4 | 8.6 |
| CEX 1 | EVOH-1 | 100 | TMP | 0 | St-Mg | 0.12 | 48 | TPU/EVOH blend/TPU | 188 | 8 | 1010 | 10.0 | 4.8 | 10.5 |
| CEX 2 | EVOH-1 | 92 | TMP | 8 | St-Mg | 0.00 | 0 | TPU/EVOH blend/TPU | 192 | 8 | 540 | Delam. | 8.4 | — |

The invention claimed is:

1. A multilayer article, consisting of a structure selected from the group consisting of $(U_1)/(X_1)/(U_2)$, $(U_3)/(U_1)/(X_1)/(U_2)/(U_4)$, $(U_1)/(X_1)/(U_2)/(T_1)$ and $(T_1)/(U_1)/(X_1)/(U_2)/(T_2)$, wherein:
- $(U_1)$ is a first layer of a first thermoplastic polyurethane resin composition;
- $(U_2)$ is a second layer of a second thermoplastic polyurethane resin composition;
- $(U_3)$ is a third layer of a third thermoplastic polyurethane resin composition;
- $(U_4)$ is a fourth layer of a fourth thermoplastic polyurethane resin composition;
- $(X_1)$ is a core layer;
- $(T_1)$ and $(T_2)$ are each independently one or more layers of one or more other thermoplastic resin compositions; and the core layer $(X_1)$ comprises:
- an ethylene vinyl alcohol copolymer (A);
- a hydroxyl group-containing compound (B) having a molecular weight of 200 or less, a ratio of a number of hydroxyl groups per molecule to the molecular weight of from 0.02 to 0.03, and a melting point of from about 23° C. to about 200° C.; and
- a fatty acid metal salt (C).

2. The multilayer article according to claim 1, wherein a content of the hydroxyl group containing compound (B) is from about 3 mass % to about 15 mass % of the barrier resin composition, based on the total mass of the barrier resin composition.

3. The multilayer article according to claim 1, wherein a content the fatty acid metal salt (C) in the core layer $(X_1)$ is from about 10 to about 250 ppm in terms of metal.

4. The multilayer article according to claim 1, wherein the hydroxyl group-containing compound (B) is 1,1,1-trimethylolpropane.

5. The multilayer article according to claim 1, wherein the metal element of fatty acid metal salt (C) is magnesium.

6. The multilayer article according to claim 1, wherein a total thickness of the multilayer article ranges from about 10 µm to about 1000 µm, and a thickness ratio of the core layer $(X_1)$ in the total layer thickness ranges from about 1% to about 20%.

7. The multilayer article of claim 1, wherein the structure is $(U_1)/(X_1)/(U_2)$.

8. The multilayer article of claim 1 wherein the structure is $(U_3)/(U_1)/(X_1)/(U_2/(U_4)$.

9. The multilayer article of claim 1, wherein the structure is $(U_1)/(X_1)/(U_2)/(T_1)$.

10. The multilayer article of claim 1, wherein the structure is $(T_1)/(U_1)/(X_1)/(U_2)/(T_2)$.

11. A chemical-resistant article of clothing consisting of a multilayer structure selected from the group consisting of $(U_1)/(X_1)/(U_2)$, $(U_3)/(U_1)/(X_1)/(U_2)/(U_4)$, $(U_1)/(X_1)/((U_2)/(T_1)$ and $(T_1)/(U_1)/(X_1)/(U_2)/(T_2)$, wherein:
- $(U_1)$ is a first layer of a first thermoplastic polyurethane resin composition;
- $(U_2)$ is a second layer of a second thermoplastic polyurethane resin composition;
- $(X_1)$ is a core layer;
- $(T_1)$ and $(T_2)$ are each independently one or more layers of one or more other thermoplastic resin compositions; and the core layer $(X_1)$ comprises:
- an ethylene vinyl alcohol copolymer (A);
- a hydroxyl group-containing compound (B) having a molecular weight of 200 or less, a ratio of a number of hydroxyl groups per molecule to the molecular weight of from 0.02 to 0.03, and a melting point of from about 23° C. to about 200° C.; and
- a fatty acid metal salt (C).

12. A chemical-resistant article of claim 11, which is a suit.

13. A chemical-resistant article of claim 11, which is a glove.

* * * * *